(12) United States Patent
Six et al.

(10) Patent No.: US 11,373,008 B2
(45) Date of Patent: Jun. 28, 2022

(54) TRANSPONDER MODULE AND ACCESS MODULE FOR ACTIVATING AND CONFIGURING SUCH TRANSPONDER MODULE

(71) Applicant: MYLAPS B.V., Haarlem (NL)

(72) Inventors: Mark Six, Heemskerk (NL); Henk Jan Ober, Heemstede (NL); Marcel Schaap, Velsen-Zuid (NL)

(73) Assignee: MYLAPS B.V., Haarlem (NL)

(*) Notice: Subject to any disclaimer, the term of this patent is extended or adjusted under 35 U.S.C. 154(b) by 0 days.

(21) Appl. No.: 15/329,149

(22) PCT Filed: Jul. 27, 2015

(86) PCT No.: PCT/EP2015/067103
§ 371 (c)(1),
(2) Date: Jan. 25, 2017

(87) PCT Pub. No.: WO2016/016160
PCT Pub. Date: Feb. 4, 2016

(65) Prior Publication Data
US 2017/0206367 A1    Jul. 20, 2017

(30) Foreign Application Priority Data

Jul. 28, 2014 (EP) .................................... 14178692

(51) Int. Cl.
*G06F 21/00* (2013.01)
*G06F 21/62* (2013.01)
(Continued)

(52) U.S. Cl.
CPC .......... *G06F 21/629* (2013.01); *G06F 21/121* (2013.01); *G06F 21/35* (2013.01);
(Continued)

(58) Field of Classification Search
CPC ...... G06F 21/35; G06F 21/629; G06F 21/121; G06F 21/44; G06F 2221/2111; G06F 2221/2137; G07C 1/22
See application file for complete search history.

(56) References Cited

U.S. PATENT DOCUMENTS 5,173,856 A    12/1992 Purnell
5,294,931 A    3/1994 Meier
(Continued)

FOREIGN PATENT DOCUMENTS

CN    101053199 A    10/2007
CN    102933443 A    2/2013
(Continued)

OTHER PUBLICATIONS

European Office Action, dated Mar. 22, 2018 for corresponding European Patent Application No. 14178692.1-1009, filed Jul. 28, 2014.
(Continued)

*Primary Examiner* — Anthony D Brown
*Assistant Examiner* — Rodman Alexander Mahmoudi
(74) *Attorney, Agent, or Firm* — Steven M. Koehler; Westman, Champlin & Koehler, P.A.

(57) ABSTRACT

Methods are described for providing access to one or more transponder functions of sports timing transponder that is configured for transmitting a signal comprising a transponder identifier to a receiver of a timing system that is configured to determine the point in time that said transponder passes said receiver. The method may comprise: establishing a communication link between said transponder and an access module configured to determine time information; determining rights information stored in a memory of said transponder, said rights information comprising one or more access conditions for determining when a user of (Continued)

said transponder has a right to access at least part of said transponder functions; receiving time information from said access module; and, determining whether said user has a right to access at least part of said one or more transponder functions on the basis of at least part of said access conditions and said time information.

18 Claims, 11 Drawing Sheets

(51) Int. Cl.
  *G06F 21/35* (2013.01)
  *G06F 21/44* (2013.01)
  *G07C 1/22* (2006.01)
  *G06F 21/12* (2013.01)

(52) U.S. Cl.
  CPC .............. *G06F 21/44* (2013.01); *G07C 1/22* (2013.01); *G06F 2221/2111* (2013.01); *G06F 2221/2137* (2013.01)

(56) References Cited

U.S. PATENT DOCUMENTS

| | | | |
|---|---|---|---|
| 5,311,185 A | 5/1994 | Hochstein et al. | |
| 5,666,101 A | 9/1997 | Cazzani et al. | |
| 5,842,118 A | 11/1998 | Wood, Jr. | |
| 5,887,176 A | 3/1999 | Griffith et al. | |
| 6,219,613 B1 | 4/2001 | Terrier et al. | |
| 6,261,247 B1 | 7/2001 | Ishikawa et al. | |
| 6,577,238 B1 | 6/2003 | Whitesmith et al. | |
| 6,864,829 B2 | 3/2005 | Bevoets | |
| 7,801,173 B2 | 9/2010 | Takatori | |
| 8,027,352 B2 | 9/2011 | Noumi | |
| 8,126,606 B2 | 2/2012 | Hung | |
| 8,441,671 B2 | 5/2013 | Elliot | |
| 8,665,891 B2 | 3/2014 | Katou | |
| 8,725,626 B2 | 5/2014 | Nystrom | |
| 8,850,477 B2 | 9/2014 | Schein | |
| 9,300,423 B2 | 3/2016 | Rubin | |
| 9,371,099 B2 | 6/2016 | Lagassey | |
| 9,489,544 B2 | 11/2016 | Naitou | |
| 9,516,352 B2 | 12/2016 | Keen | |
| 9,529,358 B2 | 12/2016 | Fredriksson | |
| 9,704,132 B2 | 7/2017 | Fraccaroli | |
| 9,843,523 B2 | 12/2017 | Mabuchi | |
| 10,026,235 B2 | 7/2018 | Van Rens | |
| 10,044,564 B2 | 8/2018 | Likkei | |
| 10,454,706 B2 | 10/2019 | Six | |
| 2003/0033035 A1 | 2/2003 | Mar | |
| 2004/0160355 A1 | 8/2004 | Bervoets | |
| 2007/0188310 A1 | 8/2007 | Mori et al. | |
| 2008/0012685 A1 | 1/2008 | Friedrich | |
| 2011/0289123 A1* | 11/2011 | Denison | G07C 9/00571 707/812 |
| 2012/0270496 A1 | 10/2012 | Kuenzi | |
| 2012/0307836 A1 | 12/2012 | Ishigooka | |
| 2012/0320927 A1 | 12/2012 | Katou | |
| 2013/0066514 A1 | 3/2013 | Das | |
| 2013/0231760 A1* | 9/2013 | Rosen | G06F 17/40 700/91 |
| 2013/0318380 A1* | 11/2013 | Behrens | H04L 12/12 713/323 |
| 2014/0169140 A1 | 6/2014 | Bisig | |
| 2014/0300446 A1* | 10/2014 | Notheis | G07C 9/00111 340/5.61 |
| 2015/0291127 A1 | 10/2015 | Ghabra | |
| 2015/0297949 A1 | 10/2015 | Aman | |
| 2015/0324597 A1 | 11/2015 | Vaidya | |
| 2015/0339406 A1* | 11/2015 | Ito | H04L 67/18 707/724 |
| 2017/0188199 A1 | 6/2017 | Ashley | |
| 2017/0222828 A1 | 8/2017 | Six | |
| 2017/0272316 A1 | 9/2017 | Johnson | |
| 2018/0206100 A1 | 7/2018 | Eisner | |

FOREIGN PATENT DOCUMENTS

| | | |
|---|---|---|
| CN | 106605229 A | 4/2017 |
| EP | 0422022 B1 | 9/1993 |
| EP | 0568066 A1 | 11/1993 |
| EP | 0949483 A2 | 10/1999 |
| EP | 1447681 A2 | 8/2004 |
| FR | 2619644 A1 | 2/1989 |
| WO | 0019235 A1 | 4/2000 |
| WO | 0103057 A1 | 1/2001 |
| WO | 02101408 A1 | 12/2002 |
| WO | 2012145675 A2 | 10/2012 |
| WO | 2014030168 A2 | 2/2014 |

OTHER PUBLICATIONS

Cenker et al., "Iterative Algorithms in Irregular Sampling: A First Comparison of Methods", In Proceedings of ICCP/91, pp. 483-489, 1991.
International Search Report and Written Opinion for International application No. PCT/EP2015/067103, dated Mar. 11, 2016.
"FLEX Transponder & FLEX Manager User Manual", May 23, 2012, XP055159892, http://www.mylaps.com/data/sitemanagement/media/2012_05 FLEX Manager.pdf Retrieved from the Internet: URL: https://web.archive.org/web/20131228065931/http://www.mylaps.com/en/manuals [retreived on Dec. 23, 2014].
Taiwanese Office Action, dated Jan. 9, 2019, for corresponding Taiwanese Patent Application No. 104124334.
Examination Report from the Australian Patent Office for Application No. 2015295563, dated Mar. 19, 2020.
Taiwanese Office Action for Taiwanese Patent Application No. 104124337, dated Feb. 1, 2019.
Office Action from U.S. Patent Office for U.S. Appl. No. 15/329,162, dated Oct. 31, 2018.
International Search Report and Written Opinion for International patent application No. PCT/EP2015/067107, dated Oct. 13, 2015.
Japanese Office Action for Japanese Patent Application No. JP2017-504154, dated Apr. 25, 2019, with English translation.
Japanese Second Office Action for Japanese Patent Application No. JP2017-504154, dated Apr. 25, 2019, with English translation.
Notification of the First Office Action from the Chinese Patent Office for Chinese patent application No. 201580039404.4, dated Jul. 1, 2019.
Japanese Office Action for Japanese Patent Application No. 2017-504144, dated Apr. 22, 2019, with English translation.
First Examination Report from the Indian Patent Office for Indian Patent Application No. 20174700936, filed Feb. 10, 2017, dated Aug. 25, 2020.
Patent Examination Report from the New Zealand Intellectual Property Office dated Apr. 13, 2021 for New Zealand Patent Application No. 727548.

* cited by examiner

TRANSPONDER MODULE AND ACCESS MODULE FOR ACTIVATING AND CONFIGURING SUCH TRANSPONDER MODULE

CROSS-REFERENCE TO RELATED APPLICATION

The present application is a national stage of and claims priority of International patent application Serial No. PCT/EP2015/067103, filed Jul. 27, 2015, and published in English as WO 2016/016160 A2, the content of which is hereby incorporated by reference in its entirety.

FIELD OF THE INVENTION

The discussion below is merely provided for general background information and is not intended to be used as an aid in determining the scope of the claimed subject matter.

The invention relates to a transponder and a module for accessing and/or configuring such transponder module, and, in particular, though not exclusively, to a method for accessing and configuring one or more functions of a transponder, a transponder module configured to communicate with an access module and an access module for enabling activation and/or configuration of transponder functions in such transponder, and a computer program product for using such method.

BACKGROUND OF THE INVENTION

Timing systems for vehicle sports events such as circuit- or off-road motorsport events or cycling events use wireless transponders mounted in or on the vehicle in order to determine timing information, e.g. lap time, total time, average lap time, rankings, etc. The transponders are configured to transmit transponder signals comprising an unique identifier that are picked-up by antennas that are arranged in, over and/or along the race track or course. The antennas are connected to decoders that transform the transponder signal of vehicles crossing the antennas into transponder data. These data are subsequently forwarded to a data processing system in order to determine timing information of vehicles that participate in the race event.

A conventional timing system is typically set up and managed by a timing operator, wherein the operator configures the transponders for the participants in the event and registers the transponder with the timing system. Currently however there is a trend that participants buy their own personal transponder so that it can be (semi)permanently installed in or on the vehicle. Before or during the event, the transponder may be registered with the timing system.

An example of a known sports timing system is described in EP1447681. The functionality of such transponder is limited and it has no or at least little possibilities for (re)configuring and/or extending the transponder functions in accordance with the needs of the user and/or the requirements of a racing event. Moreover, transponders are often built to withstand harsh conditions and are installed in the vehicle at locations that are not very accessible. Once installed, physical access to the transponder is difficult so that fast reconfiguration of the transponder and/or update of the firmware of the transponder is often not possible without physically disconnecting the transponder.

Hence, from the above it follows that there is a need in the art for improved transponders that allow easy configuration and/or update of different functionalities in the transponder and/or services associated with the transponder. In particular, there is a need in the art for methods and systems that allow a transponder to be configured in a simple, reliable and secure way on the basis of parameters such as the type of event, type of vehicle, geographical location of the event, user preferences, etc., without the need of dismounting the transponder from the vehicle.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect the invention may relate to a method for providing access to one or more transponder functions of at least one transponder.

In an embodiment, said method may comprise: establishing a communication link between said transponder and an access module configured to determine time information; preferably said time information comprising an indication on the current time; determining rights information stored in a memory of said transponder, said rights information comprising one or more access conditions for determining when a user of said transponder has a right to access at least part of said transponder functions; receiving time information from said access module; and, determining whether said user has a right to access at least part of said one or more transponder functions on the basis of at least part of said access conditions and said time information.

Hence, the method provides a simple way for determining whether a user may access a function of a transponder on the basis of rights information, i.e. user rights. The rights information may be part of license information that determine access conditions to transponder functions. The rights information (a user license) may be provided to the transponder using an access module which may serve both as a secure mobile data carrier for the rights information and as an access module (a "key") for accessing and activating the transponder functions.

In an embodiment, at least one of said one or more transponder functions may comprise transmitting a signal comprising a transponder identifier to a receiver of a timing system that is configured to determine the point in time that said transponder passes said receiver. Hence, the transponder may be configured as a sports timing transponder that is configured to communicate with a timing system. The access module may function as a key to activate the transponder and/or to enable the transponder to communicate with the timing system.

The access module may be configured to either wirelessly communicate with the transponder or to communicate with the transponder on the basis of a wired data bus, preferably a differential signalling data bus such as a CAN bus. This way, the transponder can be removably connected to the access module in order to configure to the transponder the needs of the user without dismounting it from the vehicle. The access module enables that different transponder function can be efficiently exploited by the timing operator while the transponder is owned by the user.

In an embodiment, determining whether said user has the right to access said one or more transponder functions may further comprise: sending a transponder identifier to said access module; receiving encrypted rights information from said access module, said rights information being determined on the basis of at least part of said transponder identifier, preferably said rights information further comprising firmware code for configuring at least part of said transponder functions; a cryptographic module in said transponder decrypting said encrypted rights information on the basis of a decryption key that is stored in a secure memory of said transponder; storing said decrypted rights information in said secure memory of said transponder. Hence, the basis of the transponder ID encrypted rights information may be sent to a cryptographic module in the transponder. This way, unauthorized use of the transponder may be eliminate or at least substantially reduced.

In an embodiment, determining whether said user has the right to access said one or more transponder functions may further comprise: a microcontroller in said transponder configuring at least part of said one or more transponder functions in accordance with said rights information if said user has a right to access said one or more transponder functions. The transponder may use the access conditions and the time information (e.g. the current time) in order to decide whether the access to a particular transponder function is allowed or not. If access is allowed, the transponder may configure the functions in accordance with the rights information which may define certain configurations of the transponder for which the user has paid for.

In an embodiment, determining whether said user has a right access to at least part said one or more transponder functions further comprises: said transponder sending a time request to said access module; receiving said time information from said access module, wherein time information is determined by said access module on the basis of a real-time clock in said access module. In an embodiment, said time request may comprise an encrypted authentication value, preferably an encrypted nonce, for authentication of said time information received by said transponder.

In an embodiment, determining whether said user has a right to access to at least part of said one or more transponder functions may further comprise: decrypting said encrypted authentication value; determining signed time information by combining said authentication value with said time information; encrypting said signed time information sending said encrypted signed time information to said transponder; authenticating said time information by matching said authentication value stored in said transponder with the authentication value in said signed time information. Hence, in order to determine whether the time information originates from an authorized access module, an authentication procedure may be used. This way unauthorized use of the transponder may be eliminated or at least substantially reduced.

In an embodiment, determining whether said user has a right to access to at least part of said one or more transponder functions further comprises: if said user of said transponder has no right to access at least part of said one or more transponder functions, limiting access to said at least part of said one or more transponder functions and/or to one or more services associated with said transponder. In this embodiment, the transponder may take measures to limit access to the transponder functions in case it is determined that the user has no right to access one or more transponder functions (e.g. because the user did not pay its license fee and/or the license has expired)

In an embodiment, said access module may be implemented as a secure hardware device, that is configured to be removably connected to said transponder via a data bus. In an embodiment, the access module may be configured to communicate with the transponder via a wired data bus, preferably a differential signalling data bus, such as a CAN-bus or an RS-422 bus. A differential data bus is very robust against noisy and harsh environments, thus allowing a continuous data link between the transponder and the access module during the sports event. Other types of wired data buses such as the local interconnect network (LIN) bus, Ethernet, FireWire, Universal Serial Bus (USB), etc. or an optical data bus may also be used.

In another embodiment, the access module may be configured to communicate with the transponder using a wireless interface (e.g. a Bluetooth, Wi-Fi or near field communication (NFC) protocol).

In an embodiment, said removable connection may comprise a socket for receiving said access module, wherein said socket is electrically connected via said data bus to said transponder and wherein said socket is configured for electrically connecting said secure hardware device via said data bus to said transponder.

In an embodiment, said transponder and said access module comprises a controller area network (CAN) controller and said data bus is configured as a CAN bus.

In an embodiment, establishing a communication link between said transponder and an access module may further comprise: a transponder CAN controller listening to an announce CAN message from CAN controller of the access module, the CAN ID field of said announce CAN message comprising a CAN ID associated with said access module and the payload field of said announce CAN message comprises an answer CAN ID; said transponder CAN controller receiving an announce CAN message from said access module CAN controller; said transponder CAN controller transmitting a request info CAN message to said access module, wherein the CAN ID field of said CAN message comprises said answer CAN ID and the payload of said request info CAN message comprising said transponder identifier, preferably at least part of the transponder serial number, of said transponder; and, using said transponder identifier for establishing a data connection between said transponder and said access module. The CAN bus may be implemented as a differential data bus that is robust against noise and harsh environments and allows high signaling rates. The devices connected to the CAN bus (sometimes referred to as "nodes") may be configured to communicate with each other on the basis of the CAN protocol. The CAN standard ISO-11898: 2003 defines a communication network that links all the nodes connected to a bus and enables the nodes to talk with one another on the basis of CAN messages. Nodes, e.g. a CAN-based access module, may be added at any time, even while the network is operating (sometimes referred to as "hot-plugging").

In an embodiment, said access module may be implemented as a secure module in a user device, preferably as a secure hardware or software module in a mobile user device. In an embodiment, said transponder may comprise a further wireless interface, preferably a radio interface, wherein said user device may be configured to establish a wireless communication link between said secure module and said transponder via said further wireless radio interface. Hence, in this embodiment, the access module may be implemented in a mobile device, e.g. a smart phone or an electronic tablet, and the wireless interface of the mobile device may be used to set up a connection with the transponder. This way, the transponder can be accessed even when it is mounted in areas of the vehicle that are difficult to access.

In an embodiment, said one or more access conditions may comprise expiry information for determining at what time access to at least part of said transponder functions is expired. In another embodiment, wherein said one or more access conditions may comprise location information for determining at what location or locations at least part of said transponder functions may be accessible. In yet another embodiment, said one or more access conditions may comprise one or more use conditions for determining for which transponder uses at least part of said transponder functions may be accessible. In an embodiment, said one or more transponder functions include at least one of: one or more (wireless) interface functions, a GPS function, a data logging function, one or more CAN functions, a power supply function, and/or, one or more transponder functions that depend on the geographical location of the transponder.

Hence, the access conditions may depend on time and/or location. For example, a GPS module in the transponder or the access module may generate location information which may be used in order to check whether a user has access to a certain function at a certain geographical location, e.g. a data logging function at a certain event.

In a further aspect, the invention may relate to a transponder configured to communicate with a access module, said access module comprising rights information and time information, said transponder comprising: one or more transponder function modules, at least one of said transponder function modules being configured for transmitting a signal comprising a transponder identifier to a receiver of a sports timing system for determining the point in time when said transponder passes said receiver, an interface for establishing a communication link with said access module; a secure memory for storing rights information comprising one or more access conditions for determining when a user of said transponder has a right to access at least part of said transponder functions; a computer readable storage medium having computer readable program code embodied therewith, and a microprocessor, coupled to the computer readable storage medium, wherein responsive to executing the computer readable program code, the processor is configured to perform executable operations comprising: establishing a communication link with said access module; receiving time information from said access module, preferably said time information comprising an indication of the current time; and, determining whether said user has a right to access at least part of said one or more transponder functions on the basis of at least part of said access conditions and said time information.

In another aspect, the invention may relate to an access module configured to communicate with a transponder, said transponder comprising one or more transponder function modules, wherein at least one of said transponder function modules is configured for transmitting a signal comprising a transponder identifier to a receiver of a sports timing system configured to determine the point in time that said transponder passes said receiver, said access module comprising: an interface for a communication link with said transponder; a secure memory for storing rights information comprising one or more access conditions for said user to access at least part of said one or more transponder function modules; means for determining timing information, preferably said timing information comprising an indication on the current time; a computer readable storage medium having computer readable program code embodied therewith, and a microprocessor, coupled to the computer readable storage medium, wherein responsive to executing the computer readable program code, the processor is configured to perform executable operations comprising: establishing a communication link with said transponder; generating time information; sending said time information via said communication link to said transponder for enabling said transponder to determine whether a user has a right to access at least part of said one or more transponder function modules on the basis of rights information that is stored in the memory of said transponder and said time information.

In a further aspect, the invention may relate to a socket configured for receiving an access module as described above, wherein the socket is in electrical contact with a CAN bus that is connected to one or more transponders and wherein the socket is configured to removably position the access module in the socket such that when the access module is positioned in the socket, the access module is in electrical contact with the CAN bus. The use of the socket allows access to the transponder even when it is mounted in a place with is relatively difficult to access, e.g. the wheel well and/or the base plate of the vehicle. This way, the socket for the access module (the "key") can be mounted at a place (e.g. the dashboard of the vehicle) with is easily accessible for the driver, while the transponder is mounted in a place in order guarantee a good signal transfer from the transponder to the base station of the timing system and vice versa.

In a further aspect, the invention may relate to a transponder system for use in a vehicle comprising: a transponder; a access key communicatively connected to said transponder via a data bus, preferably a CAN bus; a socket configured to receive said access key and to removably position the access key in said socket wherein when the access key is positioned in said socket, the access key being electrically connected via said data bus to said transponder, wherein said access key is configured to activate said transponder and/or to configures the transponder on the basis license information and/or firmware updates.

The invention may also relate to a computer program product comprising software code portions configured for, when run in the memory of a computer, executing any of the method described above.

The invention will be further illustrated with reference to the attached drawings, which schematically will show embodiments according to the invention. It will be understood that the invention is not in any way restricted to these specific embodiments.

DETAILED DESCRIPTION

Figure 1:
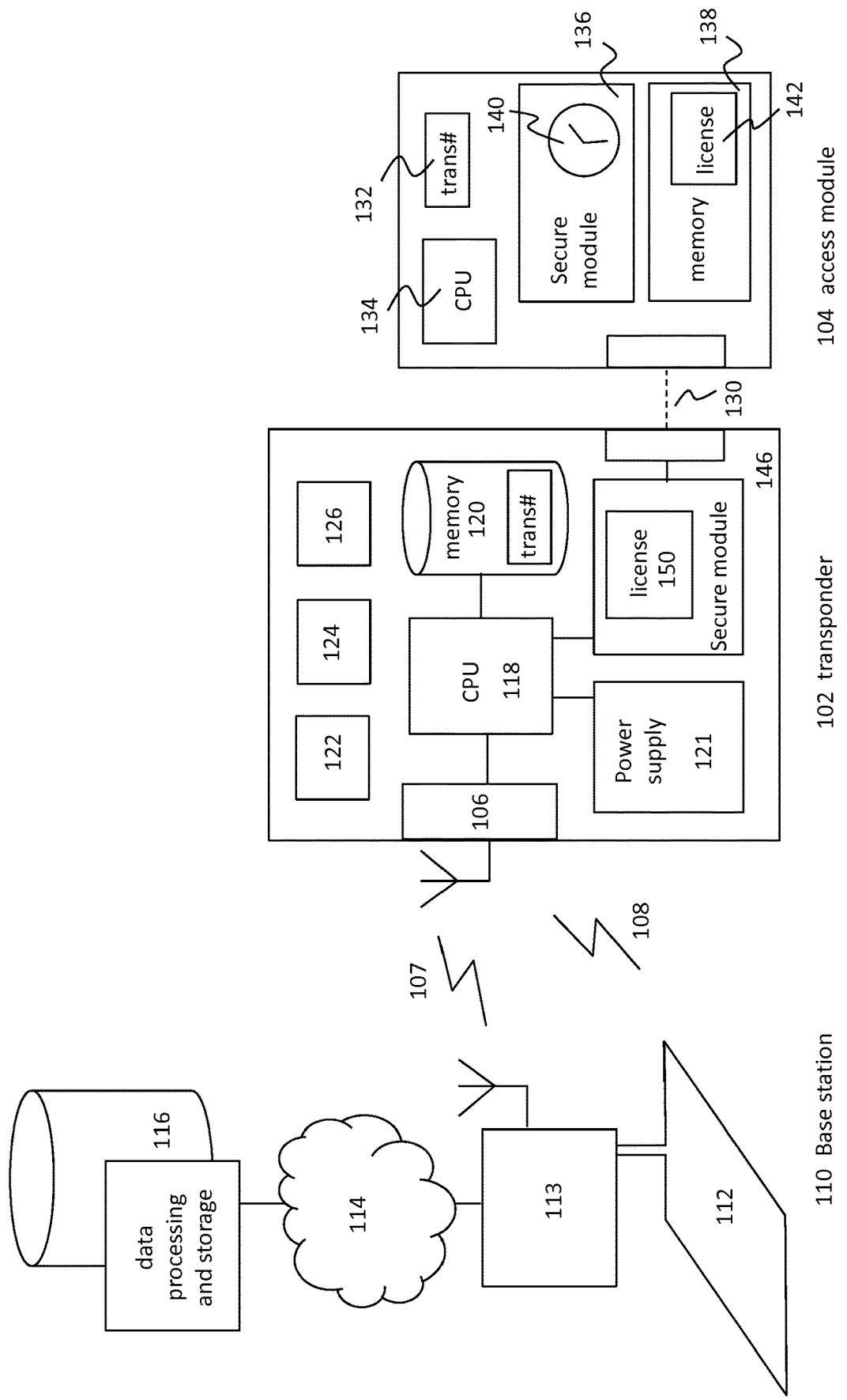
FIG. 1 schematically depicts a sports timing system according to an embodiment of the invention.

FIG. 1 schematically depicts a sports timing system according to an embodiment of the invention. In particular, FIG. 1 depicts a sports timing system comprising sports timing transponders 102 for use by participants in a sports event wherein at least one transponder is mounted in or on the vehicle (not shown) and wherein base stations 110 are installed along the racetrack. The transponder may comprise a wireless interface 106 for transmitting a transponder signal 108 comprising—amongst others—a transponder identifier to the base station 110, which may comprise receiver 113 for receiving the transponder signals.

In an embodiment, the base station may be connected to an inductive antenna 112, e.g. an inductive loop, embedded in or arranged over the race track. A loop may define an area of approximately a few meters width for data communication. Especially when a vehicle crosses the loop at high speeds this provides a very short time window (around 20-40 ms) for transmission of data. A known modulation scheme (frequency, phase shift keying and/or amplitude modulation) may be used for achieving data communication between the transponder and the base station.

A base station may transmit carrier frequency signal of a certain magnitude. When the transponder is in neighbourhood of the antenna, it will receive the base station signal and—in response—the transponder may start transmitting information, e.g. a timestamped transponder ID, to the base station by modulating the carrier signal. The frequency of the modulation frequency may be selected from a range between 0.4 and 6 GHz, preferably in the range of 0.4 and 1.0 GHz, e.g. 433, 868 or 915 MHz.

The transponder may also be configured to transmit messages without receiving a carrier frequency signal. In that case, the transponder may transmit messages between 3 and 7 MHz.

Alternatively and/or in additions, in an embodiment, the base station may be connected to one or more RF antennas 109 that are positioned along and/or over the race track. The one or more RF antennas may be configured to produce a relatively large-area RF area for providing a WLAN-type data communication between the base station (100-200 meters wide) and the transponders. The large RF area may provide a relatively large time-window for data communication between the base station and a transponder. Hence, the transponder may be configured to communicate with the base station both via an inductive antenna and RF antennas.

When a vehicle comprising a transponder approaches a base station, the transponder signal may be picked-up by the antenna (inductive loop and/or RF antennas) and detected by a receiver. A decoder in the receiver may decode and time-stamp the transponder signal before it is sent via one or more networks 114 to a data processing system 116 for determining timing information associated with the vehicles that participate in the event. This way, the data processing system may receive transponder data from all vehicles that pass the antennas along the race track, so that accurate timing information of all vehicles can obtained and relevant time information can be presented to the users.

As shown in FIG. 1, the transponder may further comprise a microprocessor 118, a memory 120 for storing data, a power supply 121 (e.g. a rechargeable battery and/or a power supply interface for an external power connection) and one or more functional transponder modules 122-126. For example, in an embodiment, the transponder may contain a radio frequency (RF) module 122 (e.g. a Bluetooth, a Wi-Fi or WLAN connection) with an external RF node.

In another embodiment, the transponder may comprise a bus interface module 124. In an embodiment, the bus interface may be a bus interface that can handle a harsh electromagnetic environment such as a controller area network (CAN) bus. Such CAN interface may be used for setting up a communication link with the motor management system of the vehicle (not shown). This way, the transponder may receive vehicle information that can be stored by e.g. a data-logging module 126 in the transponder.

In another embodiment, the functional modules may include a GPS module for determining the location of the vehicle at a certain point in time and/or a bi-directional data communication between the base station and the transponder. In that case, at least part of the base stations along the track may both comprise a receiver and a transmitter connected to the antenna.

As will be described hereunder in more detail, the transponder can be configured and/or activated on the basis of an external access module 104 that is configured to be connected to the transponder via a suitable wired or wireless interface 130. In particular, the transponder may be configured and/or activated by sending license information that is stored in the access module to the transponder, which may subsequently use the license information and configure the transponder functions accordingly.

In an embodiment, the access module may be configured to communicate with the transponder via a wired data bus, preferably a differential signalling data bus, such as a CAN-bus or an RS-422 bus. A differential data bus is very robust against noisy and harsh environments, thus allowing a continuous data link between the transponder and the access module during the sports event.

For example, the transponder may be mounted in the wheel well and connected via the CAN bus to a mounting assembly (a socket) that may be installed at a convenient and accessible part of the vehicle, e.g. on the dashboard of the vehicle. The access module may be removably mounted in the socket such that the CAN interface of the access module makes electrical contact with the CAN bus. Other types of wired data buses such as the local interconnect network (LIN) bus, Ethernet, FireWire, Universal Serial Bus (USB), etc. or an optical data bus may also be used.

In another embodiment, the access module may be configured to communicate with the transponder using a suitable wireless interface (e.g. a Bluetooth, Wi-Fi or near field communication (NFC) protocol).

The access module may comprise one or more unique transponder identifiers 132, which may be securely stored in a hardware register of the access module. The access module may further comprise a microcontroller 134, a secure module 136 and a memory 138. Here, the secure module may be configured as a tamper-free hardware and/or software module. The secure module may be configured to store sensitive information that is used during the communication with the transponder. As will be described hereunder in more detail, the process of determining whether the user has the right to access (use) and/or configure certain functional modules in the transponder may include the transmission of time information of a tamper-free real-time clock 140 and/or license information 142 to the transponder.

Preferably, the license information 142 may be stored in encrypted form in the memory of the access module. A secure module 146 in the transponder may be configured to decrypt the encrypted license information and store the license information in clear text in a secure memory 150. The license information (which also may also be referred to as rights information) may be used by the microprocessor of the transponder in order to determine which transponder functions the user may access. In particular, the license information may comprise access conditions, which may depend on time, location of the transponder and/or use of the transponder. The license information and access conductions will be described hereunder in more detail.

Hence, the transponder system as shown in FIG. 1 allows simple and flexible configuration of one or more sports timing transponders on the basis of a license, i.e. user rights that give conditional access to certain transponder functions. The license information may be provided to the transponder using an access module, which may server both as a secure mobile data carrier for the license information and software updates and as an access module (a key) for accessing the transponder functions. The access module may be configured to either wirelessly communicate with the transponder or communicate with the transponder via a data bus, preferably a differential signalling data bus such as a CAN bus. This way, the transponder can be removably connected to the access module in order to configure to the transponder according to the needs of the user without dismounting it from the vehicle. The access module enables that different transponder functions can be efficiently exploited by the timing operator while the transponder is owned by the user.

Figure 2A:
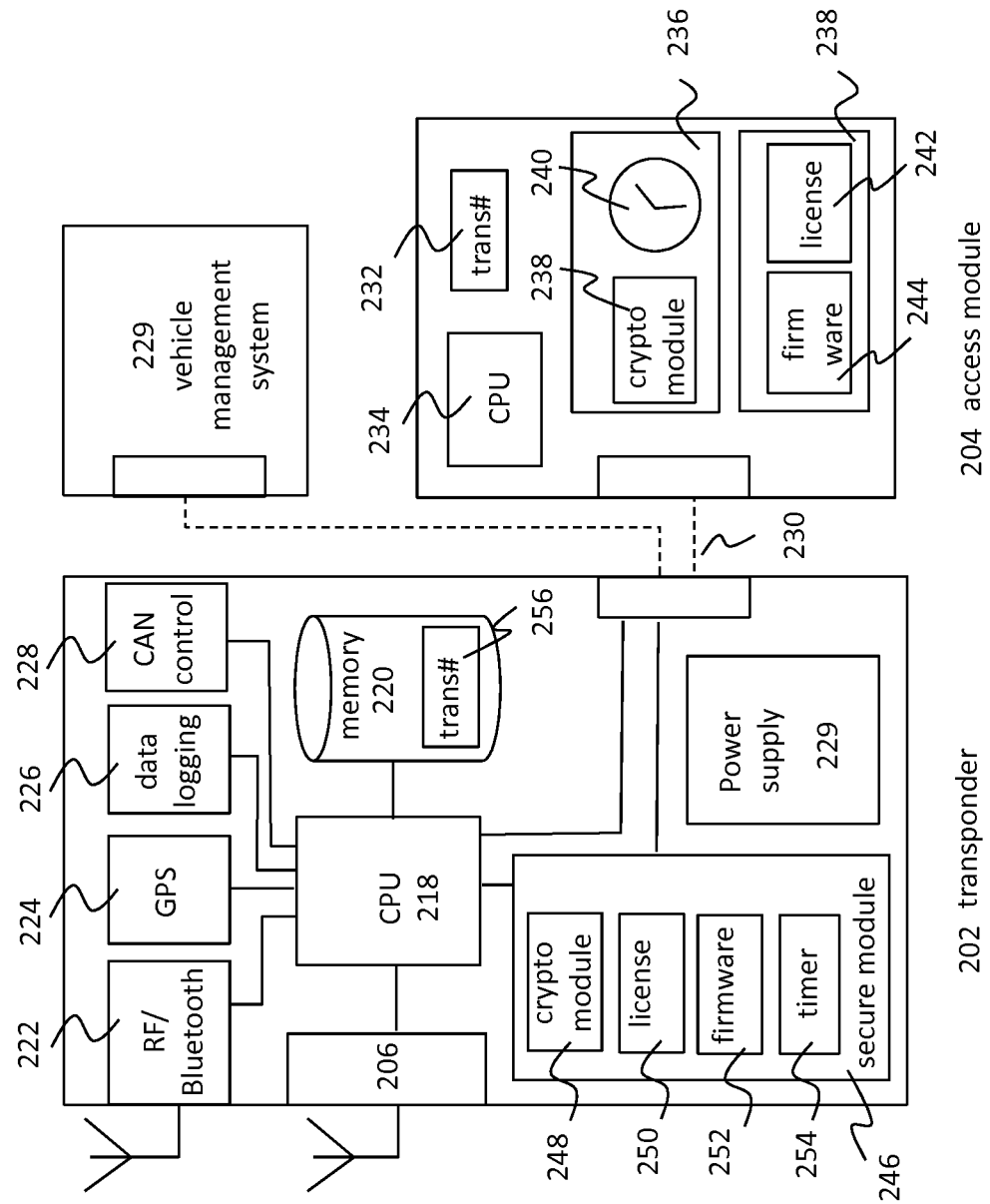
FIGS. 2A and 2B schematically depict parts of a transponder system according to an embodiment of the invention.
Figure 2B:
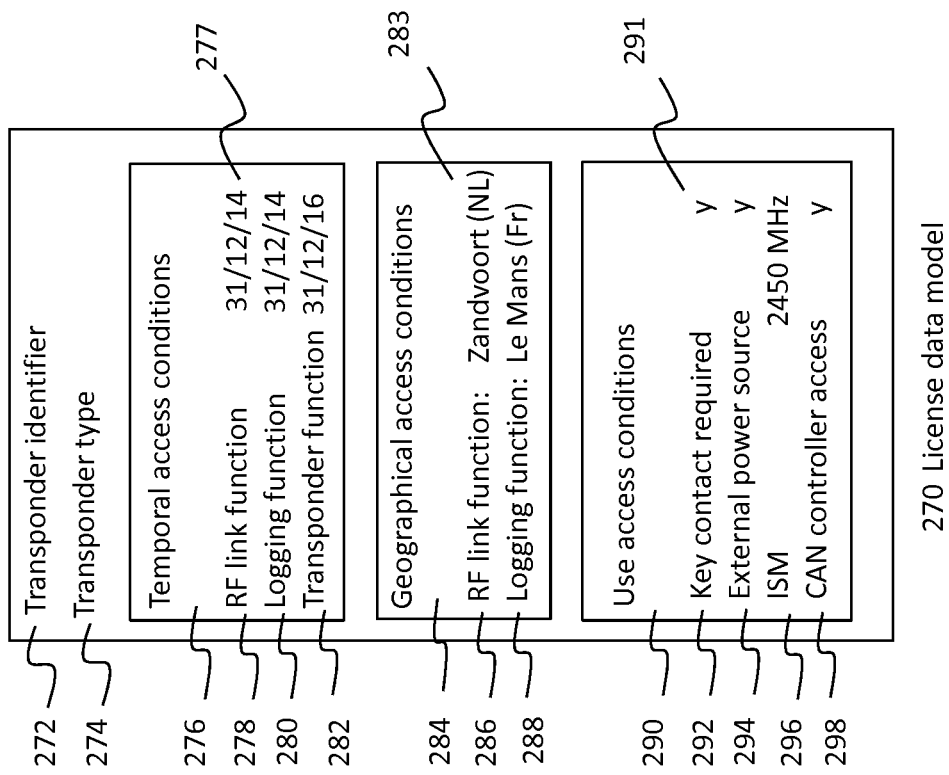

FIGS. 2A and 2B schematically depict parts of the transponder system according to an embodiment of the invention. In particular, FIG. 2A depicts a more detailed example of a transponder system wherein the transponder 202 may comprise multiple functional modules 206,222,224,226,228, 229 that may be configured on the basis of licensing information. The transponder 202 may comprise a microprocessor 218 that is connected to a (standard) wireless interface module 206 for communication with the base stations along the racing track, a radio frequency (RF) interface module 222 to a fast, high-speed data link between the transponder and a WLAN that is located along the race track (e.g. in the finish area), a GPS module 224 for generating location information that may be used by the transponder, a data logging module 226, and a CAN controller module 228.

The CAN controller module may allow the transponder to connect to the CAN-bus of the vehicle so that the transponder may communicate with the motor management system of the vehicle and/or other sensor modules that are connected to the CAN-bus. The transponder may further comprise a power supply module 521 (e.g. a rechargeable battery and/or a power supply interface for an external power connection) for controlling the power supply to the functional modules in the transponder 229.

Access and configuration of the functional modules of the transponder may be controlled by license information that is stored in the secure module 246 of the transponder. The microprocessor of the transponder may use the license information (also referred to as rights information) in the secure module in order to determine to which functional modules the user has access to and under which conditions. These conditions, which may be referred to as access conditions, will be described in more detail with reference to FIG. 2B.

The access module 204 may be removably connected to the transponder using a suitable interface, e.g. a CAN-bus or a Bluetooth link. When establishing a connection, an authentication procedure may be used for authenticating the access module to the transponder and vice versa. A transponder identifier 256, e.g. a unique transponder (serial) number, may be used during the authentication procedure for identifying the transponder to the access module. The transponder identifier that may be stored in a tamper-free register of the transponder may be matched with one or more transponder identifiers 232 that are stored in the access module.

When a connection between the transponder and the access module is successfully established, the microprocessor of the transponder may be triggered determine to which functions the user has access to on the basis of time information that provides an indication on the current time. In an embodiment, the access module may determine the time information on the basis of a real-time clock 240 that is implemented in the secure module 236 of the access module. The secure module of the access module may comprise a crypto module 238 for sending the time information to the secure module in transponder in encrypted form so that unauthorized use of the transponder functions and/or license key can be prevented. To that end, a first cryptosystem may be used for sending encrypted time information to the transponder. The first cryptosystem may comprise encryption and decryption algorithms and at least one key for encrypting and decrypting data that are exchanged between the transponder and the access module in order to securely sent time information to the transponder. Known "light" cryptosystems such as the (extended and/or corrected) Tiny Encryption Algorithm (TEA) or RC4 or variants thereof, may be used in order to send the timing information in encrypted form to the transponder.

The access module may comprise a memory comprising encrypted license information 242 and/or encrypted software code 244, e.g. firmware updates and/or patches, wherein the license information and/or software code is encrypted on the basis of a second cryptosystem.

As will be described hereunder in more detail, the access module may be used as a secure mobile data carrier for storing license information and/or software in encrypted form and for providing access to the transponder functions. In contrast to the timing information, the access module does not comprise components of the second cryptosystem, e.g. key information (decryption keys), that can be used to decrypt the license information and/or software that is stored in the access module. Therefore, the second cryptosystem may be implemented on the basis of a more extended encryption scheme such as the Advance Encryption Standard (AES) or a variant thereof.

In an embodiment, the second cryptosystem may implemented as an asymmetrical cryptosystem, e.g. a private-public cryptosystem wherein the license information and/or software code may be encrypted using a public key and decrypted using different (secret) private key that is stored in the secure module of the module. Alternatively, the second cryptosystem may be implemented as a symmetric cryptosystem, wherein the encryption key is identical to the decryption key.

In an embodiment, the access module may send version information (which may include a version number and/or timestamp) of the license and software code to the transponder so that the transponder can compare the version information with the license and/or software code version that is stored in the secure module of the transponder. Alternatively, the access module may receive version information of the license and software code that is installed on the transponder so that the access module can perform the comparison. If the transponder or the access module determines that new license information and/or software code is available for the transponder, the new version(s) may be sent to the secure module 246 of the transponder for decryption.

A cryptographic module 248 in the secure module of the transponder may use the second cryptosystem (i.e. encryption and decryption algorithms and key information) for decrypting license information and/or software code and the first cryptosystem for decrypting and encrypting data for transmitting encrypted time information from the transponder to the license key.

For example, when encrypted license information and/or software code is sent by the access module to the transponder, the cryptographic module may decrypt the encrypted license information and software codes using at least one decryption key of the second cryptosystem. The decryption key and the decrypted (cleartext) license information 250 and/or software code 252 may be stored in a tamper-free memory of the secure module.

As described above, the transponder may use time information originating from the real-time clock in the access module to check whether the temporal access conditions with respect to the use of a certain transponder function are met or not. In some embodiments, so-called expiry information (i.e. information determining up to which point in time the license is valid) in the license information may be used to determine a time period for a timer 254 in the secure module of the transponder. The timer may be used to monitor the time period during which the license is valid. For example, in an embodiment, the timer may be implemented as a counter wherein (part of) the license may be finished when the timer has reached a predetermined value (e.g. zero). The microprocessor may insert timer information in the transponder messages 108 which can be processed by the central data processing system so that the validity of (part of) the license of a participant in the sports event can be monitored in time.

In an embodiment, the timer information is continuously inserted in the transponder messages. Alternatively and/or in addition, in an embodiment, the timer information may be inserted in the transponder message when the timer has reached the end of the time period. In that case, the end of the license period may be signalled to the central data processing system on the basis of a flag or a code in the transponder messages.

FIG. 2B depicts an example of a data model 270 of a license that is used by the transponder system according to various embodiments of the invention. The license information may comprise one or more transponder identifiers 272 and one or more transponder types 272 indicating to which transponder the license applies. Further, the license may comprise different sets of access conditions 276,284,290 which may depend on time, location or use of the transponder.

In an embodiment, the license may contain temporal access conditions 276. These conditions may be linked to a particular transponder function and expiry information 277, wherein the expiry information determines the point in time up to which access by a user to the transponder function is allowed. Expiry information may comprise the date when access to a particular transponder function will end or will be limited to a certain basic functionality. In the example of FIG. 2B, the basic transponder function 282 is licensed up to 31 Dec. 2016 and the RF link function 278 and data logging function 280 are licensed up to 31 Dec. 2014.

In another embodiment, the license may contain location (or geographical) access conditions 284. In that case, the license with regard to some of the transponder functions is limited to areas defined in the geographic information 283. For example, in FIG. 2B, the RF link function and the data logging functions are limited to a certain area in the Netherlands and France respectively. A geographical area in the license may be defined by coordinates, which can be compared to the location information that is generated by the GPS module in the transponder. The transponder functions may be used in case the location information is within the area.

In yet another embodiment, the license may contain use access conditions 290. These conditions may define access to certain uses of the transponder. In some embodiments, a predetermined value of a (binary) flag 291 may be used in order to indicate whether a certain use of the transponder is required or not. For example, in the example in FIG. 2B, the flag of a first use access condition 292 "key contact required" is set to "true" demanding that access to the transponder functions is only possible when the transponder is in contact with the access module. Hence, in this mode the access module may be used as a key to "unlock" access to the transponder functions.

Further, a flag of a second use access condition 294 "external power source" is set to "true" demanding that the transponder, in particular the power supply (battery) of the transponder, needs to be connected to an external source. A third use access condition 296 "ISM" may be set to so a certain ISM band indicating that the radio (RF) link of the transponder will use the 2.4 GHz ISM band. A flag of a fourth use access condition "CAN controller access" 298 may indicate that the transponder may be connected to external devices via the CAN-bus. It is submitted that many transponder functions, services and uses may be controlled on the basis of the license information and that FIG. 2B just illustrates a non-limiting example.

Figure 3:
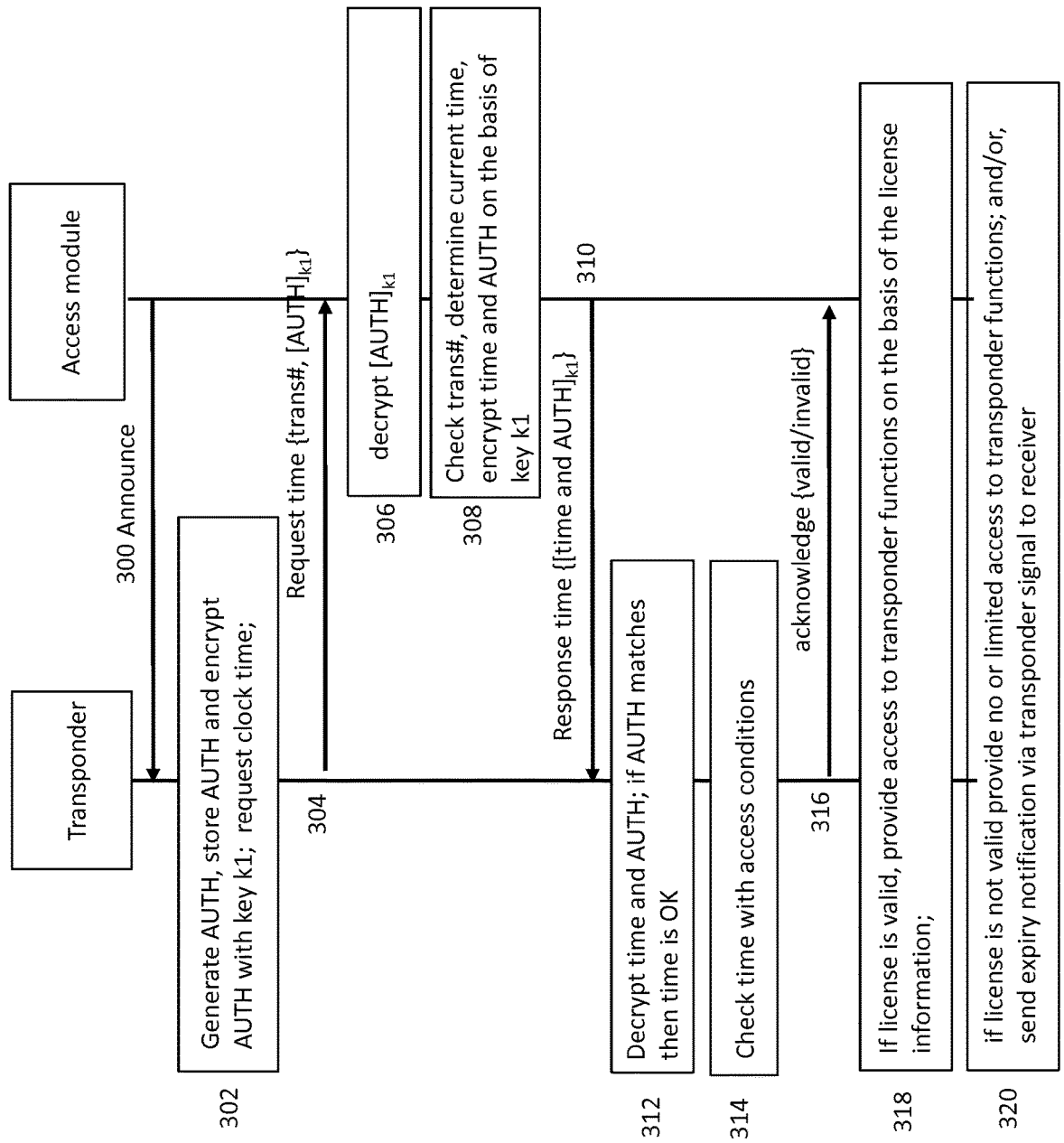
FIG. 3 depicts a flow diagram of a process for providing access to transponder functions of a sport timing transponder according to an embodiment of the invention.

FIG. 3 depicts a flow diagram of a process for providing access to transponder functions of a sport timing transponder according to an embodiment of the invention. First a connection between the access module and the transponder may be established. Thereafter, the access module may send one or more announce messages to the transponder (step 300) wherein the announce message indicates that a transponder can request a data connection with the access module.

In response to the announce message, the transponder may request time information form the access module in order to check whether the license is still valid. In order to avoid misuse of the access module, a secure connection may be established between the access module and the transponder wherein data are encrypted using the first cryptosystem as described with reference to FIG. 2A. To that end, the secure module in the transponder may generate an authentication key AUTH, preferably a cryptographic nonce, that may be generated by a pseudo-random generator in the crypto module of the transponder. The transponder may store the authentication key and encrypt the authentication key using an encryption algorithm and at least one encryption key k1 (step 302), before it is sent in a request time message to the access module (step 304). The request time message may further comprises the transponder ID.

The secure module in the access module may decrypt the authentication key (step 306) using a decryption algorithm and a decryption key of the first cryptosystem. Thereafter, the access module may check the transponder ID in the response time message with the transponder ID stored in the memory of the access module. If both transponder IDs match, it may be decided that the access module can be used with the transponder. In that case, the current time may be determined on the basis of the real-time clock and combined with the authentication key. The time and authentication key may be combined on the basis of a predetermined function which is known by the transponder. The time and the authentication key may be encrypted using an encryption algorithm and an encryption key of the first cryptosystem (step 308). The encrypted information may be sent in a response time message to the secure module of the transponder (step 310), which may decrypt the time and the authentication key and compare the authentication key that was stored in the memory of the secure module with the decrypted authentication (step 312).

If the stored authentication key matches the authentication key that was received form the access module, the transponder may decide that the response time message originates from the correct access module. In that case, the transponder may use the current time in the response time message in order to review the license that is stored in the secure module of the transponder. In particular, it may use the current time to check whether the temporal access conditions in the license information are met (step 314). In an embodiment, an acknowledgement message may be sent by the transponder to the access module to inform the access module that the current license in the transponder is valid, partly valid or invalid (step 316).

In response to the outcome of the review of the license, the transponder and/or access module may initiate certain measures. For example, if the license is valid, access to the transponder functions may be provided as defined in the license information (step 318). In case the license or part thereof is not valid, no or limited access to the transponder functions may be provided (step 320). Further, in some embodiments, if the license is not valid, access to the basic transponder function may be provided wherein the transponder messages that are sent to the base station comprise an expiry notification which can be detected by base station of the central data processing server.

Figure 4:
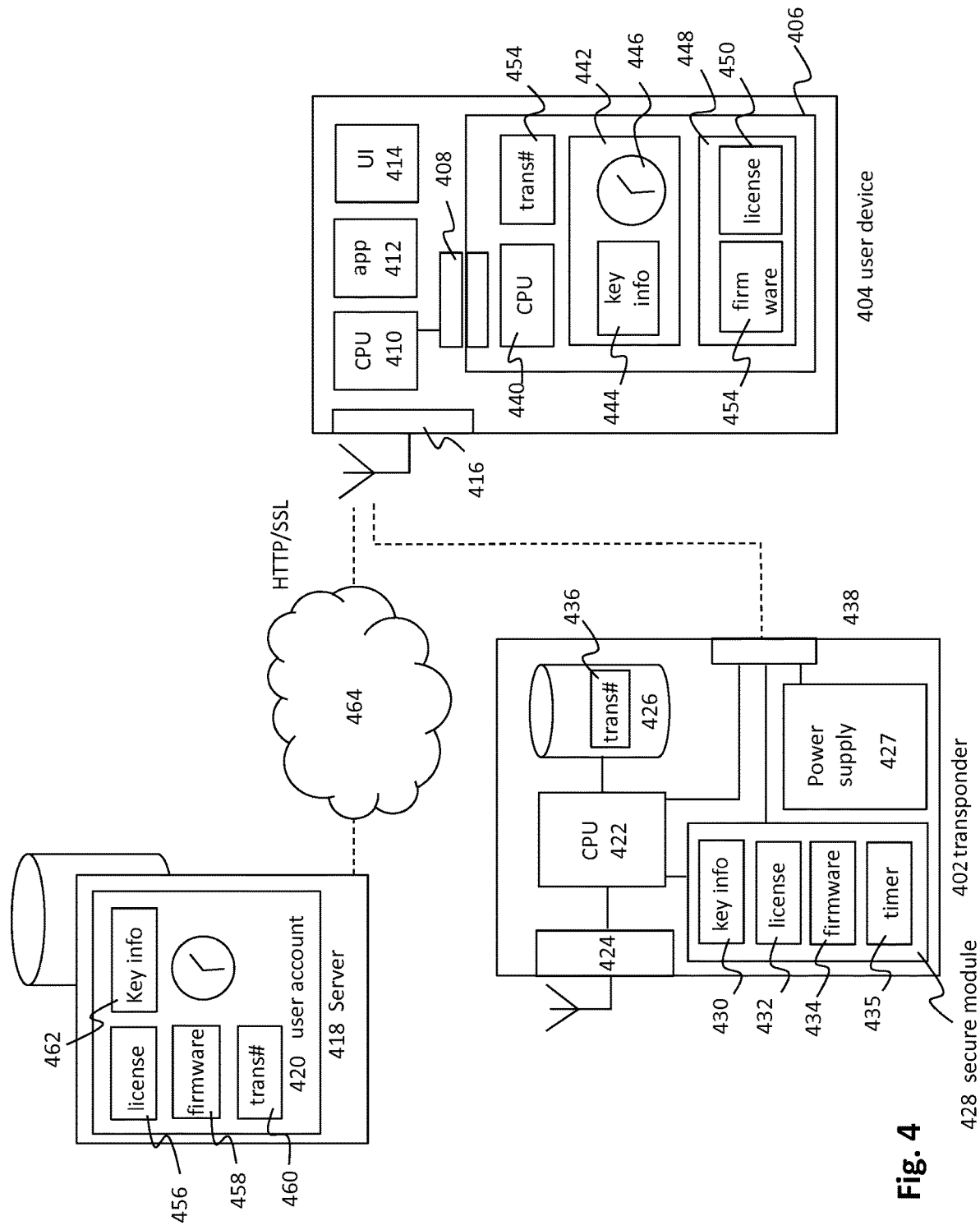
FIG. 4 depicts a transponder system according to another embodiment of the invention.

FIG. 4 depicts a transponder system according to another embodiment of the invention. The system in FIG. 4 may comprise a transponder 402 and a user device 404 (e.g. a mobile phone, an electronic table, a laptop, a personal computer, etc.) comprising an access module 406. The access module may be implemented in the user device in various ways. In an embodiment, the access module may be implemented as a secure card, e.g. a smart card or a secure digital (SD) card, which may be electrically connected via an interface 408 to the microprocessor 410 of the mobile user device. Alternatively, in another embodiment, the access module may be configured as a secure software module, wherein the key information and the encryption and decryption algorithms may be protected using known techniques such as white-box cryptography and/or code obfuscation techniques.

A transponder client application 412 may be installed on the user device, wherein the client application may render a (graphical) user interface 414 for controlling the wireless interface 416 of the user device 422 for managing communication between the access module and the transponder and the access module and a transponder server application that is hosted on a server 418. The transponder server application may provide users of access modules access to user accounts 420.

The transponder and the access module may be configured in a similar way as described with reference to FIGS. 1 and 2. In particular, the transponder may comprise a microprocessor 422, a wireless interface 424 for sending transponder messages to a base station, a memory 426, a power supply 427 (e.g. a rechargeable battery and/or a power supply interface for an external power connection) and a secure module 428 comprising key information 430, encrypted license information 432, encrypted software code 434 and a timer 435. A transponder identifier 436 may be stored in the memory or a dedicated register of the transponder. Further, the transponder may comprise an interface 438 for establishing a communication link with the user device.

Similarly, the access module may comprise a microprocessor 440, a secure module 442 comprising key information 444 and a real-time clock 446 and a memory 448 comprising encrypted license information 450 and/or software codes 452 (e.g. firmware) and one or more transponder identifiers 454.

In this particular embodiment, the user may instruct the transponder client application to contact the server application for accessing the user account 420 in order to request whether new license information 456 and/or software updates 458 associated with a particular transponder identifier 460 is/are available. If this is the case, the server application may use key information 428 in order to encrypt the license information and/or software updates on the basis of an encryption algorithm of the second cryptosystem, before it is sent via one or more networks 464 and the user device to the secure module. Here, communication between the transponder client and transponder server application may be established on the basis of a secure link, e.g. an HTTP/SSL link. Hence, before contacting the transponder, the user may update the access module via the user account with the most up-to-date license information or software updates. Alternatively and/or in addition, the user may buy a new license or upgrade the license via its user account in order to get access to desired transponder functions as for example described in detail with reference to FIGS. 2A and 2B.

After the update of the license information and software in the access module, a connection between the access module and the transponder may be established on the basis of a suitable wireless connection between the transponder and the user device such as a Bluetooth, WiFi or a Near Field Communication (NFC) protocol and access to transponder functions of the sport timing transponder may be managed on the basis of license and time information in a similar way as described with reference to the process of FIG. 3.

Figure 5:
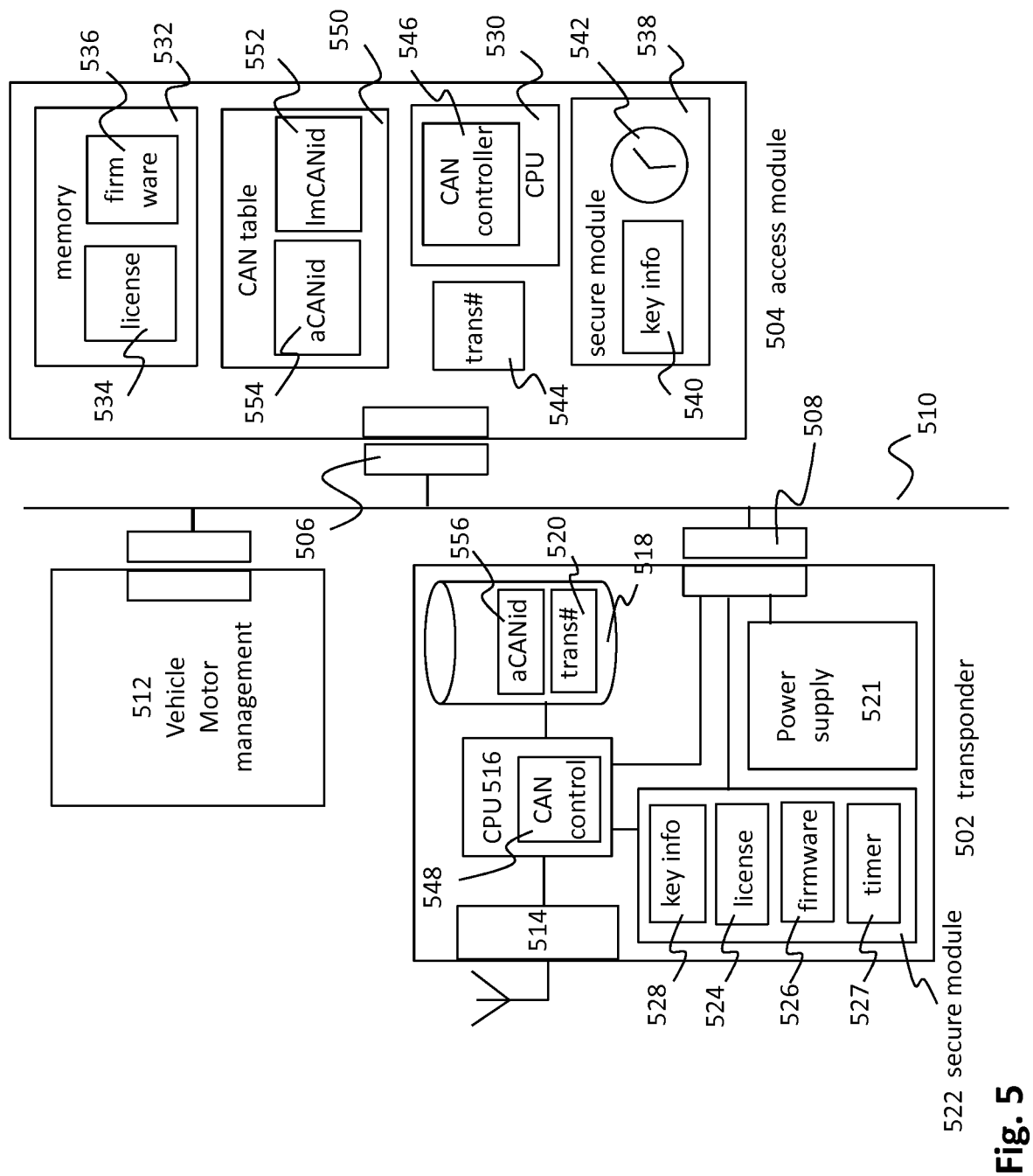
FIG. 5 depicts a transponder system according to yet another embodiment of the invention.

FIG. 5 depicts a CAN-based transponder system according to a further embodiment of the invention. In this particular embodiment, the system may comprise a transponder 502 and an access module 504 that are connected via a CAN interface 506,508 to a Controller Area Network (CAN) bus 510. In one embodiment, the CAN bus may be arranged to form a local network between one or more transponders and at least one access module. The CAN bus signaling is differential so that it is robust against noise and harsh environments and allows high signaling rates.

The devices connected to the CAN bus (sometimes referred to as "nodes") may be configured to communicate with each other on the basis of the CAN protocol. The CAN standard ISO-11898: 2003 defines a communication network that links all the nodes connected to a bus and enables the nodes to talk with one another on the basis of CAN messages. There may or may not be a central control node, and nodes may be added at any time, even while the network is operating (sometimes referred to as "hot-plugging"). A device that is configured according to the CAN standard may be referred to as a CAN device.

In an embodiment, the CAN bus in FIG. 5 may be part of the CAN network of the vehicle. In that case the transponder and/or access module may communicate to other ($3^{rd}$ party) CAN devices 512 that are connected to the CAN bus on the basis of the CAN protocol. For example, the transponder and/or access module may communicate with the vehicle motor management system and/or other vehicle sensor devices on the basis of the CAN protocol.

A large part of the functionality of the transponder and the access module in FIG. 5 may be similar to those illustrated in FIG. 4. Hence, the transponder may comprise, a wireless interface 514 for the base station, a microprocessor 516, a memory 518 comprising a transponder identifier 520, a power supply 521 (e.g. a rechargeable battery and/or a power supply interface for an external power connection) and a secure module 522 comprising a license 524, software code 526 (e.g. firmware), key information 528 and a timer 527. Similarly, the access module may comprise a microprocessor 530, a memory 532 comprising encrypted license information 534 and software code 536 (e.g. firmware updates), a secure module 538 comprising key information 540 and a real-time clock 542. The access module may further comprise one or more transponder IDs 544 for identifying the transponders that can be can be connected to the access module.

In order for the transponder and the access module to communicate via the CAN bus, the transponder and the access module may comprise a CAN controller 546,548 comprising a transceiver (not shown) for broadcasting CAN messages over the CAN bus to other CAN devices that are connected to the bus and for receiving broadcasted CAN message from other CAN devices. The CAN controller may broadcast CAN messages over the CAN bus wherein each CAN message comprises a source identifier field that comprises a CAN identifier (CAN ID), wherein the CAN ID identifies the CAN device that has broadcast the CAN message. The CAN ID may be implemented as the Standard CAN 11-bit identifier as defined in ISO-11898: 2003.

The access module may be configured as a CAN device comprising a CAN table 550 in its memory comprising the CAN ID 552 that it uses for broadcasting its CAN messages to the transponders that are connected to the CAN bus. The CAN controller of a transponder may comprise a filter for filtering CAN messages with a CAN ID of the access module.

In a conventional CAN network, CAN devices typically comprise a static preconfigured CAN ID. Such scheme however is not very suitable for sports timing transponders, which may be connected to a third-party CAN-bus (such as the CAN bus of the vehicle) that may have already a large number of nodes connected thereto. For example, if the static (preconfigured) CAN ID of a transponder coincides with a CAN ID of another CAN device, data communication between the transponder, the access module and other CAN device (such as the vehicle management system) would be disrupted. Therefore, in some embodiments, the access module may be configured to dynamically assign a CAN ID to a transponder.

Dynamic assignment of a CAN ID to the transponder may start with the access module broadcasting a so-called announce CAN message to the transponder, wherein the source ID field of the announce CAN message comprises a CAN ID of the access module 550 (lmCANid). The access module may insert a selected CAN ID in a predetermined part of the payload of the CAN message. This CAN ID may be referred to as an answer CAN ID (aCANid) 554, which should be used by the transponder as a source ID. The aCANid may be selected by the access module from a list of available CAN IDs in the CAN table. In an embodiment, the access module may select a CAN ID that does not match with the (static) CAN ID of CAN devices that are already connected to the CAN bus. The access module may thus use an announce CAN message for dynamically assigning a CAN ID—an answer CAN ID (aCANid)—to a transponder, which may store the answer CAN ID in its memory 556.

In order to confirm the assignment of the answer CAN ID to the transponder, the transponder may respond by broadcasting a response CAN message to the access module, wherein the source ID field of the response CAN messages comprises the answer CAN ID (aCANid). Further, the transponder may insert its transponder ID 520 (e.g. the serial number) in a predetermined part of the payload of the response CAN message. When the access module receives a response CAN message with the answer CAN ID in the source ID field, it may determine that this message was sent by a transponder in response to an earlier sent announce CAN message and that the payload comprises the transponder ID of the transponder.

The access module may then check the transponder ID in the response CAN message with the transponder ID 544 that is stored in its memory in order to determine whether the access module can be used together with the transponder. For example, if the transponder ID in the response CAN message matches the transponder ID in the access module, the access module may determine that it may set up a communication link with the transponder for data exchange, including e.g. the transmission of encrypted license information, software code (e.g. firmware) and/or time to the transponder. A more detailed description of this process will be described with reference to FIGS. 6 and 7.

Figure 6:
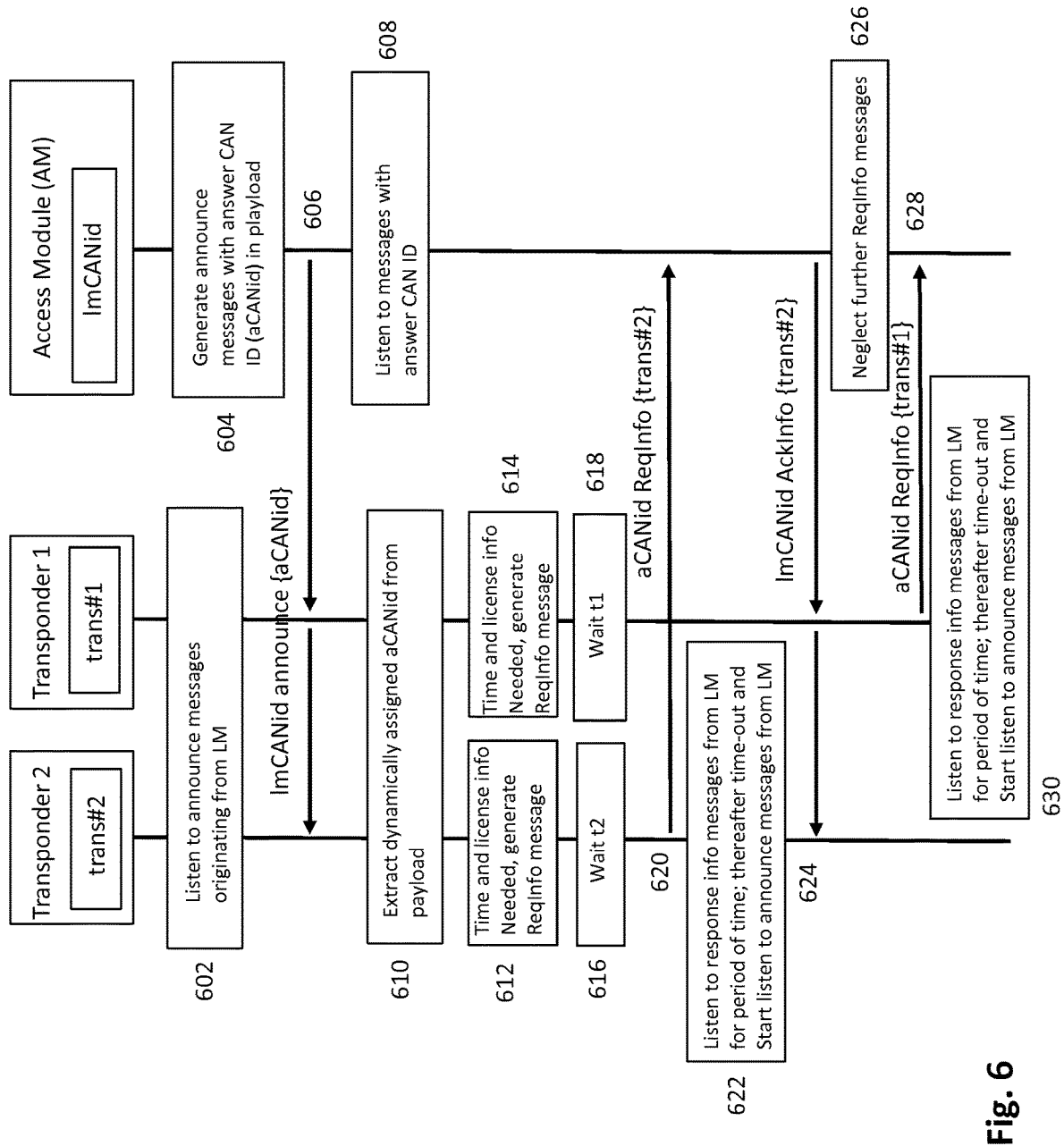
FIG. 6 depicts a flow diagram of part of a process for providing access via a CAN bus to transponder functions of a sport timing transponder according to an embodiment of the invention.

FIG. 6 depicts a flow diagram of a first phase of a process for providing CAN-based access to transponder functions of one or more sports timing transponders according to an embodiment of the invention. In particular, the flow diagram relates to a process for providing access to transponder functions of a transponder that is connected via a CAN bus to an access module as for example described with reference to FIG. 5.

The process may start with one or more transponders, each being identified by a transponder ID, that listen to the CAN bus for announce CAN messages originating from an access module that is identified by a certain CAN ID (lmCANid) (step 602). Then the access module may generate an announce CAN message in which an answer CAN ID (aCANid) is inserted in a particular part of the payload of the announce CAN message (step 604). The generated announce CAN message may be subsequently broadcasted over the CAN bus to the other CAN devices, in this example two transponders, that are connected to the CAN bus (step 606). Thereafter, the access module may start listening to the CAN bus for CAN messages with the answer CAN ID as the source ID field of the CAN message (step 608).

Meanwhile, the transponders may receive the announce CAN message and determine on the basis of the source ID of the CAN message that the message originates from the access module. Further, the transponder may determine that the message is an announce message and extract the answer CAN ID (aCANid) from its payload (step 610). In case the one or more transponders would like to receive information from the access module (e.g. license information, time and/or software updates), a response CAN message may be generated. This message may hereafter be referred to as a "request info" CAN message (steps 612,614), wherein the source ID field of the request info CAN message may comprise the aCANid and a predetermined part of the payload may comprise the transponder ID.

In order to avoid that different transponders may send a request info CAN message with the same aCANid at the same time to the access module, each transponder may generate a waiting time t on the basis of its transponder ID (steps 616,618). For example, in an embodiment, at least part of the transponder ID may be used as a seed for a random generator in the transponder so that each transponder generates a different wait time (e.g. in the example of FIG. 6 a first waiting time t1 and different second waiting t2).

As the second waiting time was shorter, the second transponder may be the first transponder to that sends a request info CAN message comprising its transponder ID (in this example the serial number serial #2 of transponder 2) in the payload of the message (step 620) to the access module. Thereafter, the second transponder may start listening for response info messages from the access module for a period of time (step 622). In an embodiment, the transponder may be configured to stop listening for response info messages after a predetermined time (a "time-out") and to return to its previous listening state in which it listens to announce messages originating from the access module (i.e. the state described with reference to step 602 in FIG. 6).

In the example of FIG. 6, the second transponder is the first transponder to send a request info message to the access module. In response, the access module may acknowledge the info request of the second transponder by sending an acknowledge info CAN message comprising the transponder ID of the second transponder to the transponders (step 624). After acknowledging the request of the second transponder, the access module does not accept request info CAN messages of other transponders until it has completed the info request(s) of the second transponder (step 626). The request info message that is sent after a waiting time t1 by the first transponder to the access module (step 628) will therefore be neglected by the access module. The first transponder will therefore not receive an acknowledge message in response to its request info message. After a predetermined time, a time-out may appear and the first transponder may switch back to its previous state in which it listens to announce messages originating from the access module (step 630).

Figure 7:
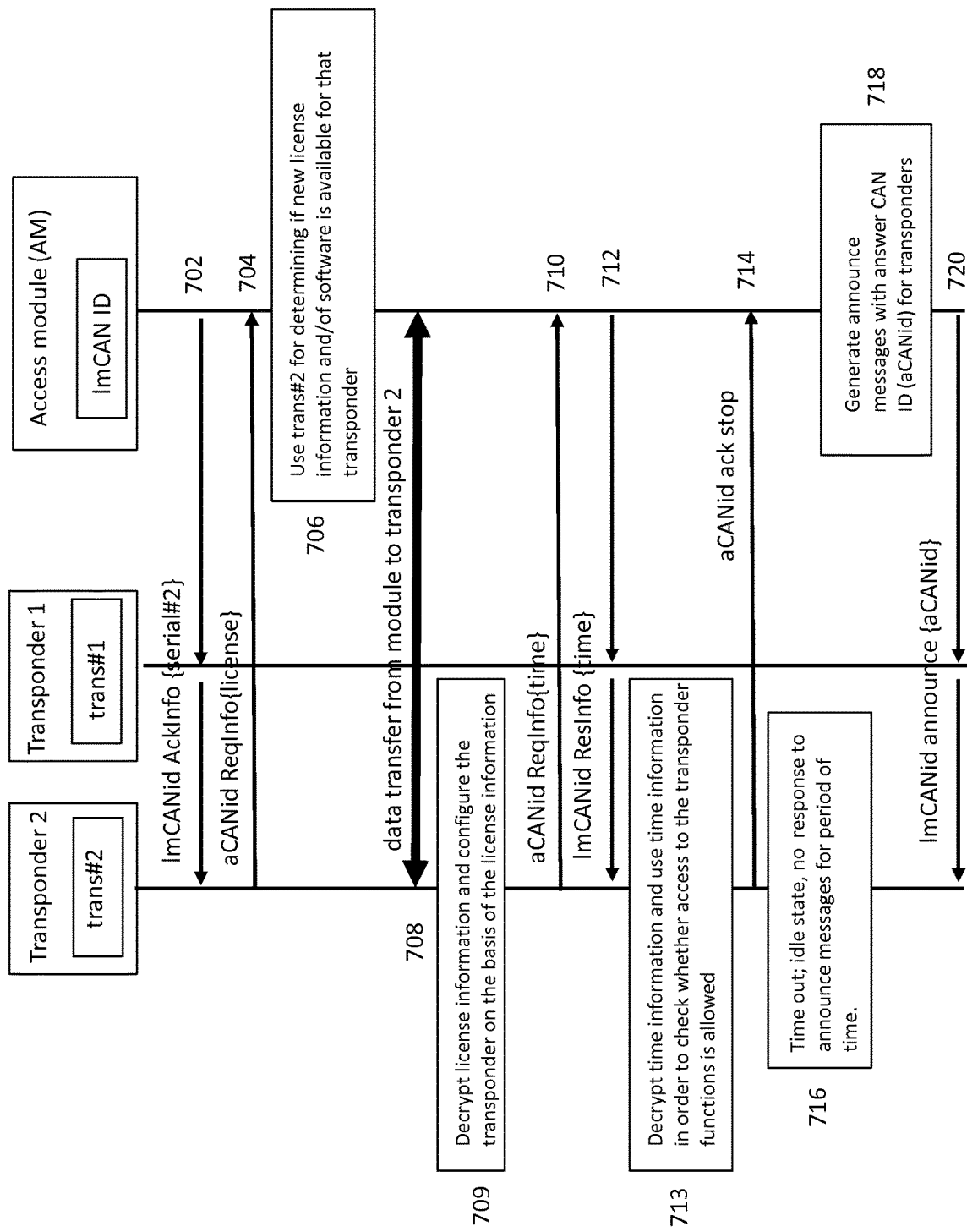
FIG. 7 depicts a flow diagram of part of a process for providing access via a CAN bus to a transponder functions of a sport timing transponder according to an embodiment of the invention.

FIG. 7 depicts a flow diagram of a second phase of a process for providing access via a CAN bus to transponder functions of one or more sport timing transponder according to an embodiment of the invention. The process of FIG. 7 may take place after the process of FIG. 6 in which the access module acknowledges to process an info request CAN message of the second transponder by sending an acknowledge info message comprising the transponder ID of the second transponder to the second transponder (step 702). When the second transponder receives the acknowledge info CAN message comprising a transponder ID of the second transponder, it may determine that the access module has accepted its info request. Thereafter, the transponder may request the access module whether new license information is available (step 704). To that end, the access module may use the transponder ID in order to determine whether it has new license information for transmission to the second transponder (step 706). If available, the new (encrypted) license information may be sent by the access module to the secure module of the second transponder (step 708). The secure module of the transponder may decrypt the encrypted license information, store the new license and configure the functional module in the transponder on the basis of the license information (step 709).

Alternatively and/or in addition, the transponder may request time information (e.g. the current time) from the access module (step 710). In response, the access module may send encrypted time information to the secure module of the transponder (step 712). The secure module of the transponder may decrypt the time information and use it to check whether the transponder license or parts thereof are valid (step 713). In an embodiment, the transmission of the time information may include an authentication process that is similar to the process described with reference to FIG. 3. In that case, the CAN message that is sent to the access module in step 710 may comprise an encrypted authentication key AUTH, which may be used to authenticate the response message of the access module that comprises the time information in encrypted form in as similar way as described with reference to steps 304-312 of FIG. 3.

Thereafter, the communication session between the access module and the second transponder may be ended. In an embodiment, the second transponder may send an acknowledge stop CAN message to the access module (step 714) and may switch itself to an idle state wherein it does not respond to announce messages for a predetermined time (step 716). Alternatively, the second transponder may stop sending messages to the access module so that after a predetermined time a time-out appears. Thereafter, the access module may start generate announce messages (step 718) which may be send to the transponders (step 720). In that case, the first transponder may respond to the announce message in order to set up a communication session between the first transponder and the access module in a similar way as described above.

Figure 8:
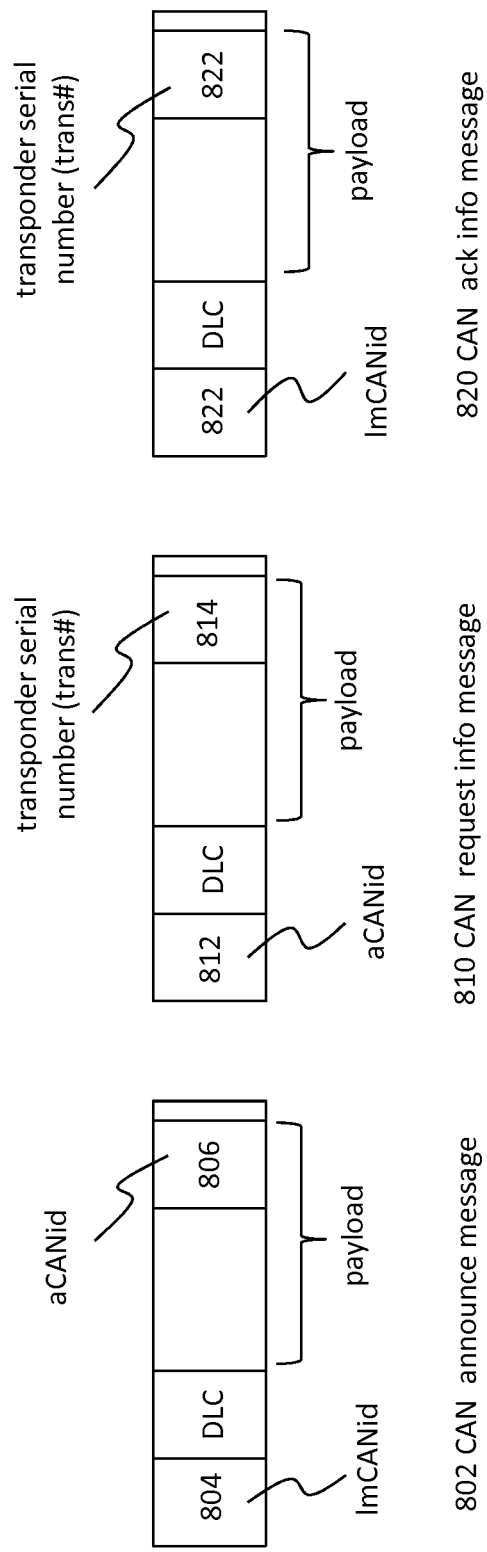
FIG. 8 depicts schematics of data format of CAN messages according to an embodiment of the invention.

FIG. 8 depicts schematics of data format of CAN messages according to an embodiment of the invention. The CAN messages may be formatted on the basis of the standard CAN message format comprising an 11-bit CAN identifier or the extended CAN message format comprising a 29-bit CAN identifier for identifying the source of the CAN message. The CAN messages may comprise a payload between 0 and 8 bytes of data wherein the DLC data field indicates the number of bytes in the message.

As shown in FIG. 8, the CAN announce message 802 may comprise a source ID field 804 comprising the CAN ID of the access module (lmCANid). The payload (or a predetermined part thereof) may comprise the answer CAN ID 806 (aCANid) that should be used by the transponder as CAN ID. The CAN request info CAN message 810 may comprise a source ID field 812 comprising the answer CAN ID (aCANid) and the payload (or a predetermined part thereof) may comprise the transponder ID 814 of the transponder that transmits the request info CAN message. The CAN acknowledge info message 820 may comprise a source ID field 822 comprising the CAN ID of the access module (lmCANid) and the payload (or a predetermined part thereof) may comprise the transponder ID 822 of the transponder that is selected by the access module in order to set up a communication link.

The CAN controller in the transponders and the access module may be configured to generate and broadcast these CAN messages over the CAN bus to other CAN devices. Similarly, the CAN controller in the transponders and the access module may be configured to receive these CAN message and process the messages on the basis of the information in the payload. The messages in FIG. 8 enable a access module to dynamically assign a CAN ID to a particular transponder and to set up a temporarily point-to-point connection between the access module and a transponder within the CAN network.

It is submitted that the embodiments in FIG. 1-8 are not limiting. Further, elements of one embodiment may be combined with one or more elements of another embodiment without leaving the scope of the invention. Moreover, the access module may also comprise two or more transponder identifiers so that the access module may provide access to two or more transponders. In an embodiment, the license information may comprise first license information associated with a first transponder and second license information associated with a second transponder. For example, in certain situations a vehicle may comprise more than one transponder, e.g. a transponder and a back-up transponder. In another embodiment, a user may have two or more vehicles with a transponder. In that case, the access conditions may require a connection of the access module to the transponder in order to keep the transponder functions active so that only one transponder can be activated at the same time. This way, the access module may be used as a transponder key for activating transponder functions.

The sports timing transponder may be used for any type of motorized or non-motorized sports events, including but not limited to circuit and off-read racing using cars, karts or motors, biking events, radio control (RC) racing, etc.

Figure 9:
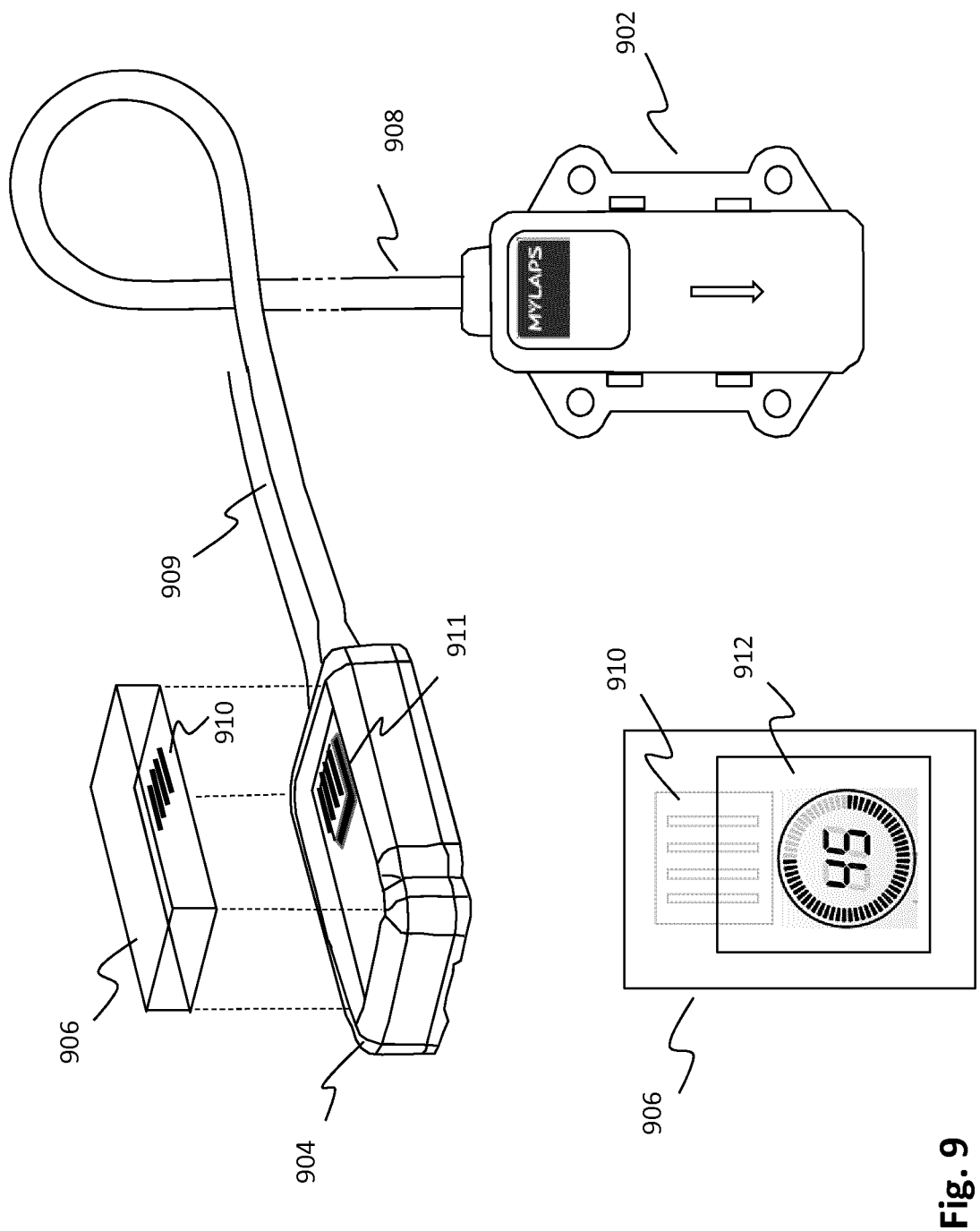
FIG. 9 depicts an access module and a socket for removably connecting such access module to a CAN bus according to an embodiment of the invention.

FIG. 9 depicts a system for removably connecting the access module (an access key) via a data bus, such as a CAN bus, to a transponder according to an embodiment of the invention. In particular, FIG. 9 depicts a (hardware) memory card 906 comprising an access module (as described with reference to FIGS. 1-3) and a socket 404 that is configured to receive the hardware card and to removably position the memory card in the socket. When the hardware card is positioned in the socket, the electrical contacts 910 of the hardware card make electrical contact with contacts 911 of the socket that may be electrically connected via CAN bus wires 908 to a transponder 902. A further CAN bus wire 909 may connect the transponder and the access key to the CAN bus of the vehicle in which the system as depicted in FIG. 9 is mounted. This way the transponder may be directly connected to the motor management system of the vehicle and/or a power source (e.g. a battery) of the vehicle. The inset of FIG. 9 shows a top-side of the access module which may comprise a display 912 for displaying certain information to the driver.

The system of FIG. 9 may be installed in the vehicle such that the transponder can be mounted in a place with is relatively difficult to access, e.g. the wheel well and/or the base plate of the vehicle and socket for the access key can be mounted at a place (e.g. the dashboard of the vehicle) with is easily accessible for the driver. The transponder needs to be mounted in such places in order guarantee a good signal transfer from the transponder to the base station and vice versa. The (part of) the CAN bus of the vehicle may be used to establish a data link between the transponder and the access key via the CAN bus. As the CAN bus is very robust against harsh environments (e.g. electrical EM noise) a reliable data connection can be established under different conditions. Obviously, the system in FIG. 9 may be extended to multiple transponders (e.g. a main transponder and one or more back-up transponders) which are connected via the CAN bus to the access module. The access module may be used as a key to activate the transponder and it may be used as an access module for configures the transponder on the basis license information and/or firmware updates.

Figure 10:
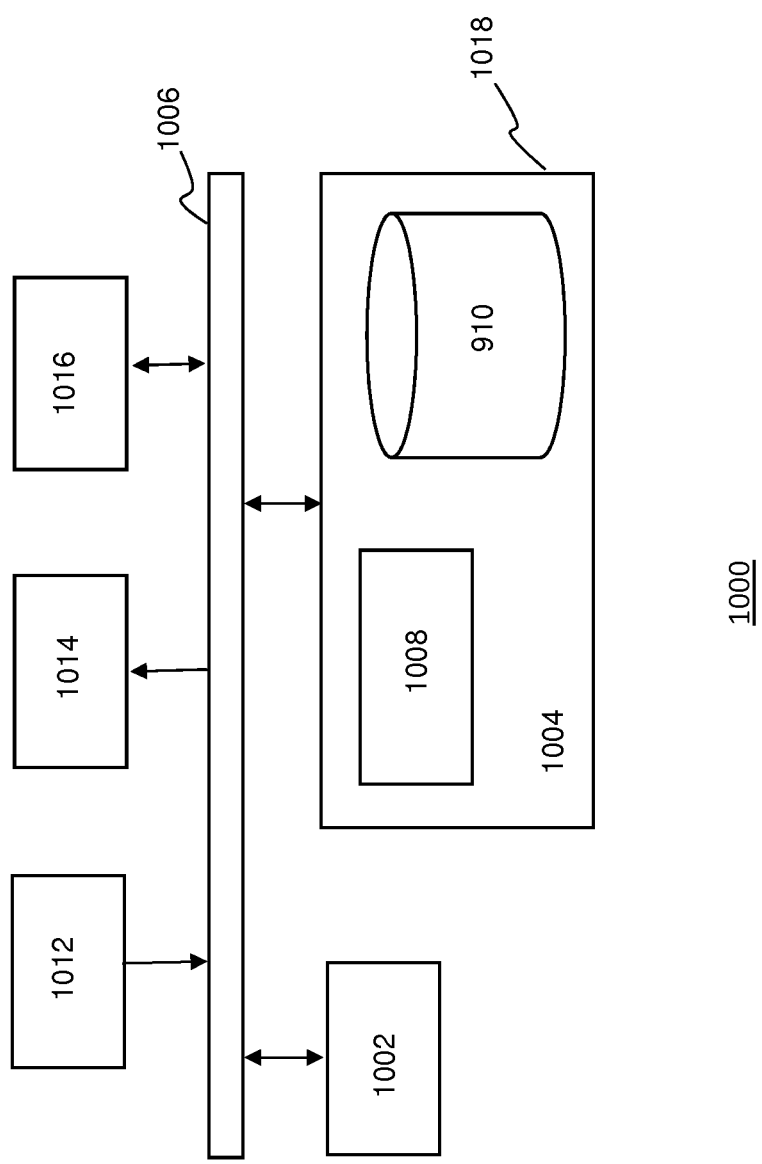
FIG. 10 depicts a block diagram illustrating an exemplary data processing system that may be used in systems and methods as described in this application.

FIG. 10 depicts a block diagram illustrating an exemplary data processing system that may be used in systems and methods as described with reference to FIG. 1-9. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1056. In one aspect, data processing system may be implemented as a computer that is suitable for storing and/or executing program code. It should be appreciated, however, that data processing system may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive or other persistent data storage device. The processing system may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system.

As pictured in FIG. 10, memory elements 1004 may store an application 1018. It should be appreciated that data processing system 1000 may further execute an operating system (not shown) that can facilitate execution of the application. Application, being implemented in the form of executable program code, can be executed by data processing system 1000, e.g., by processor 1002. Responsive to executing application, data processing system may be configured to perform one or more operations to be described herein in further detail.

In one aspect, for example, data processing system 1000 may represent a client data processing system. In that case, application 1018 may represent a client application that, when executed, configures data processing system 1000 to perform the various functions described herein with reference to a "client". Examples of a client can include, but are not limited to, a personal computer, a portable computer, a mobile phone, or the like.

In another aspect, data processing system 1000 may represent a server. For example, data processing system 1000 may represent an HTTP server in which case application 1018, when executed, may configure data processing system 1000 to perform HTTP server operations.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for configuring a plurality of sports timing transponders used by participants in a vehicle sporting event prior to or during the event, each transponder being mounted to a vehicle of each participant, the method comprising:
    for each transponder of the plurality of sports timing transponders and without removing the transponder from the vehicle, selectively activating a transponder function of a sports timing transponder needed for use of the sports timing transponder during the vehicle sporting event by:
    establishing a communication link between the transponder mounted in or on the vehicle and an access module, the access module being external to the transponder and communicatively separable from the transponder via the communication link, the access module comprising a real-time clock and being configured to determine time information, the time information comprising an indication of a current time determined based on the real-time clock;
    the transponder determining rights information stored in a secure memory of the transponder, the rights information comprising one or more temporal access conditions for determining when the participant using the transponder has a right to activate the transponder function needed for use of the sports timing transponder during the vehicle sporting event;
    the transponder receiving the indication of the current time from the access module via the communication link;
    the transponder determining whether the participant has the right to activate the transponder function needed for use of the sports timing transponder during the vehicle sporting event based on the one or more temporal access conditions stored in the secure memory of the transponder and the indication of the current time received from the access module;
    the transponder activating the transponder function only if the transponder determines that the one or more temporal access conditions are met; and
    the transponder function upon said activation, configuring the transponder to transmit, in response to the transponder receiving a query signal from a base station of a sports timing system, a plurality of transponder signals to a receiver of the base station for determining the point in time at which the transponder passes the receiver, the base station being external to the access module and the base station being positioned outside the vehicle, each of the plurality of transponder signals comprising a transponder identifier.

2. The method according to claim 1 wherein determining whether the participant has the right to activate the transponder function further comprises:
    sending a transponder identifier to the access module;
    receiving encrypted rights information from the access module, the rights information being determined on the basis of at least part of the transponder identifier;
    a cryptographic module in the transponder decrypting the encrypted rights information on the basis of a decryption key that is stored in a secure memory of the transponder;
    storing the decrypted rights information in the secure memory of the transponder.

3. The method according to claim 2 further comprising:
    a microcontroller in the transponder configuring the transponder function in accordance with the rights information if the participant has a right to activate the transponder function.

4. The method according to claim 1 wherein determining whether the participant has a right to activate the transponder function further comprises:
    the transponder sending a time request to the access module;
    the transponder receiving the time information from the access module, wherein time information is determined by the access module based on the real-time clock in the access module.

5. The method according to claim 4 wherein the time request comprises an encrypted authentication value for authentication of the time information received by the transponder.

6. The method according to claim 5 wherein determining whether the participant has a right to activate the transponder function further comprises:
    the access module decrypting the encrypted authentication value;
    the access module determining signed time information by combining the authentication value with the time information;
    the access module encrypting the signed time information;
    the access module sending the encrypted signed time information to the transponder;
    the transponder authenticating the time information by matching the authentication value stored in the transponder with the authentication value in the signed time information.

7. The method according to claim 1 wherein determining whether the participant has a right to activate the transponder function further comprises:
    if the participant of the transponder has no right to activate the transponder function, deactivating the transponder function.

8. The method according to claim 1 wherein the transponder and the access module comprise a controller area network (CAN) controller and the data bus is configured as a CAN bus.

9. The method according to claim 8 wherein establishing a communication link between the transponder and the access module further comprises:
    the transponder CAN controller listening to an announce CAN message from the access module CAN controller, wherein a CAN ID field of the announce CAN message comprises a CAN ID associated with the access module and a payload field of the announce CAN message comprises an answer CAN ID;

the transponder CAN controller receiving an announce CAN message from the access module CAN controller;

the transponder CAN controller transmitting a request info CAN message to the access module, wherein the CAN ID field of the CAN message comprises the answer CAN ID and the payload of the request info CAN message comprises the transponder identifier of the transponder; and, using the transponder identifier for establishing a data connection between the transponder and the access module.

10. The method according to claim 1 wherein the access condition comprises expiry information for determining at what time access to the transponder function is expired.

11. A sports timing transponder usable by a participant in a vehicle sporting event, the sports timing transponder being mountable to a vehicle of the participant, the sports timing transponder being configured to communicate with an access module without removing the transponder from the vehicle, the access module being external to the transponder, the access module comprising rights information and time information, the transponder comprising:

a transponder function module needed for use of the sports timing transponder during the vehicle sporting event, the transponder function module configuring the transponder to transmit, using a wireless transmitter, a plurality of transponder signals to a receiver of a base station of a sports timing system for determining a point in time when the transponder passes the receiver, the base station being external to the access module, each of the plurality of transponder signals comprising a transponder identifier;

an interface configured to establish a disconnectable communication link with the access module after the transponder has been mounted to the vehicle and without removing the transponder from the vehicle;

a secure memory for storing rights information, the rights information comprising one or more temporal access conditions for determining when the participant of the transponder has a right to activate the transponder function module;

a computer readable storage medium having computer readable program code embodied therewith, and a processor, coupled to the computer readable storage medium, the transponder function module, the interface and the secure memory, wherein responsive to executing the computer readable program code, the processor is configured to perform executable operations comprising:

establishing a communication link via the interface between the transponder and the access module, the access module comprising a real-time clock and being configured to determine time information, the time information comprising an indication of a current time determined based on the real-time clock;

determining rights information stored in the secure memory of the transponder, the rights information comprising one or more temporal access conditions for determining when the participant has a right to activate the transponder function;

receiving the indication of the current time from the access module via the communication link;

determining whether the participant has the right to activate the transponder function module based on the one or more temporal access conditions and based on the indication of the current time; and, activating the transponder function module needed for use of the sports timing transponder during the vehicle sporting event only if the transponder determines that the one or more temporal access conditions are met.

12. An access module configured to communicate with a sports timing transponder, the access module being external to the transponder, the transponder comprising a transponder function module configuring the transponder to transmit a plurality of transponder signals to a receiver of a base station of a sports timing system for determining a point in time when the transponder passes the receiver, the base station being external to the access module, each of the plurality of transponder signals comprising a transponder identifier, the access module comprising:

an interface for a disconnectable communication link with the transponder;

a secure memory for storing rights information comprising one or more access conditions for a participant to activate the transponder function module;

a real-time clock; and, a computer readable storage medium having computer readable program code embodied therewith, and a processor, coupled to the computer readable storage medium, the interface, the secure memory and the real-time clock, wherein responsive to executing the computer readable program code, the processor is configured to perform executable operations comprising:

establishing a communication link via the interface with the transponder;

generating time information, the time information comprising an indication of a time determined based on the real-time clock;

sending the time information via the communication link to the transponder, the timing information and rights information that is stored in the memory of the transponder enabling the transponder to determine whether the participant has a right to activate the transponder function module needed for use of the sports timing transponder during the vehicle sporting event, the transponder function module enabling the transponder to transmit a plurality of transponder signals to a receiver of a base station of a sports timing system for determining a point in time when the transponder passes the receiver, the base station being external to the access module and the base station being positioned outside the vehicle, each of the plurality of transponder signals comprising a transponder identifier.

13. The transponder according to claim 11, wherein the processor is configured to perform executable operations for determining whether the participant has the right to activate the transponder function module, the executable operations further comprising:

sending a transponder identifier to the access module;

receiving encrypted rights information from the access module, the rights information being determined on the basis of at least part of the transponder identifier;

a cryptographic module in the transponder decrypting the encrypted rights information on the basis of a decryption key that is stored in a secure memory of the transponder;

storing the decrypted rights information in the secure memory of the transponder.

14. The transponder according to claim 11, wherein the secure memory comprises firmware code for configuring the transponder function module to enable data communication with the base station.

15. The transponder according to claim 11, wherein the transponder function module is configured to select a modulation scheme and/or a modulation frequency enabling data communication with the base station.

16. The transponder according to claim 11, wherein the transponder function module is configured to transmit the plurality of transponder signals in a time window of 40 ms or less.

17. The access module according to claim 12,
wherein the secure memory comprises firmware code for configuring the transponder function module that is needed for use of the sports timing transponder during the vehicle sporting event; and
wherein the processor is further configured to send the firmware code to the transponder to configure the transponder function module.

18. The access module according to claim 12, wherein the secure memory comprises instructions to configure the transponder to select a modulation scheme and/or a modulation frequency enabling data communication with the base station.

* * * * *